May 10, 1932.   J. DE LA CIERVA   1,857,807
AIRCRAFT WITH AUTO ROTATIVE WINGS
Original Filed April 4, 1929   2 Sheets-Sheet 2
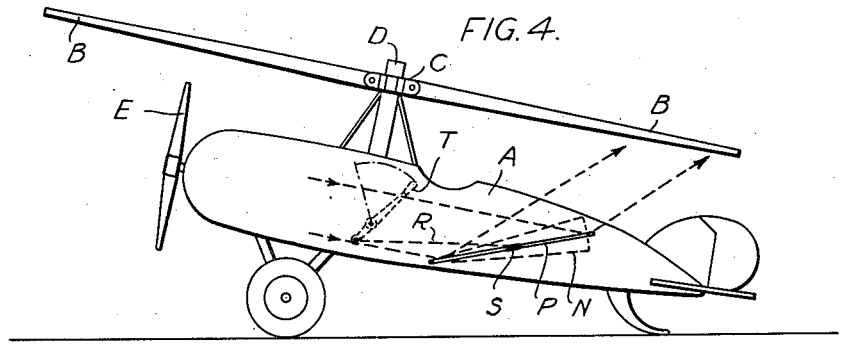
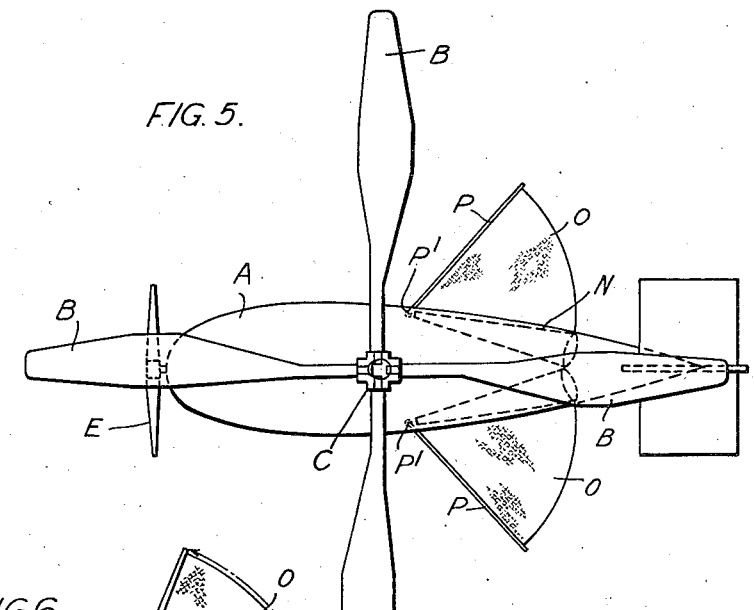
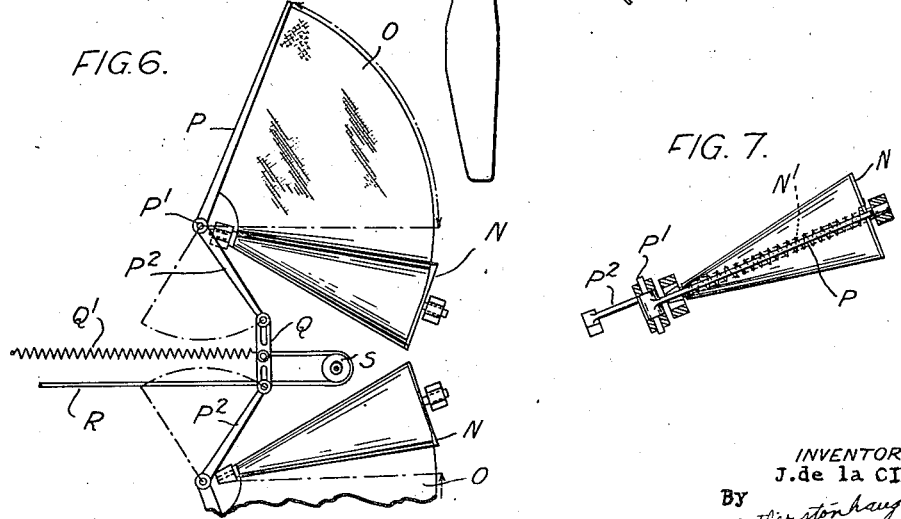
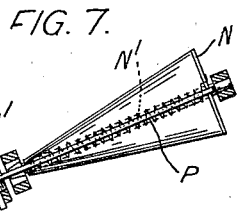
INVENTOR
J. de la CIERVA.
By Featherstonhaugh & Co.
ATTYS.

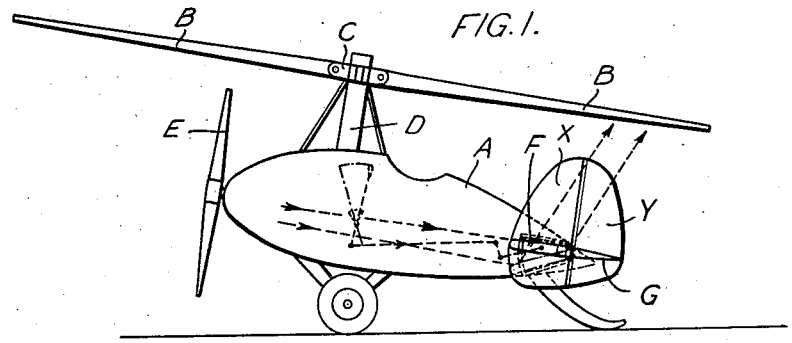
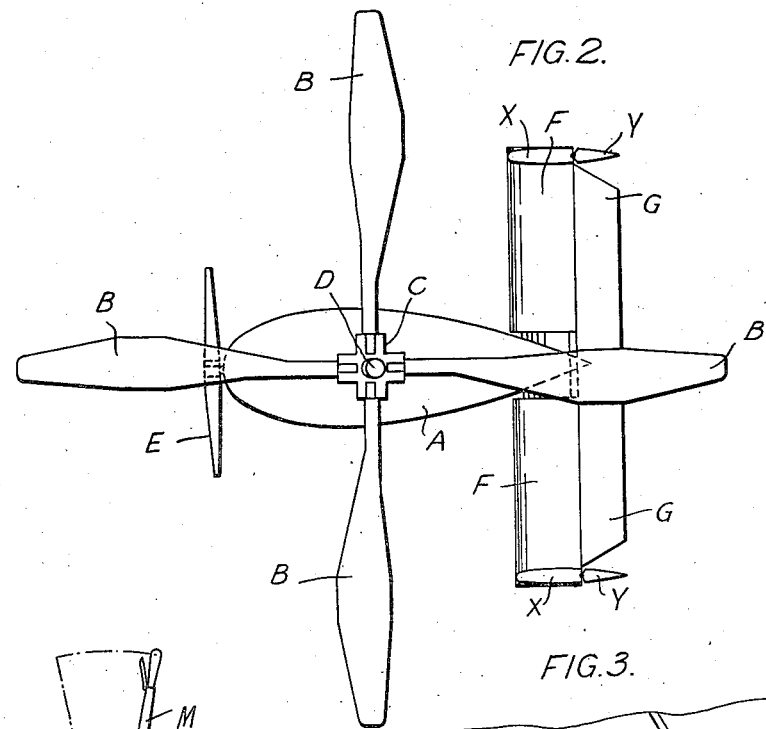
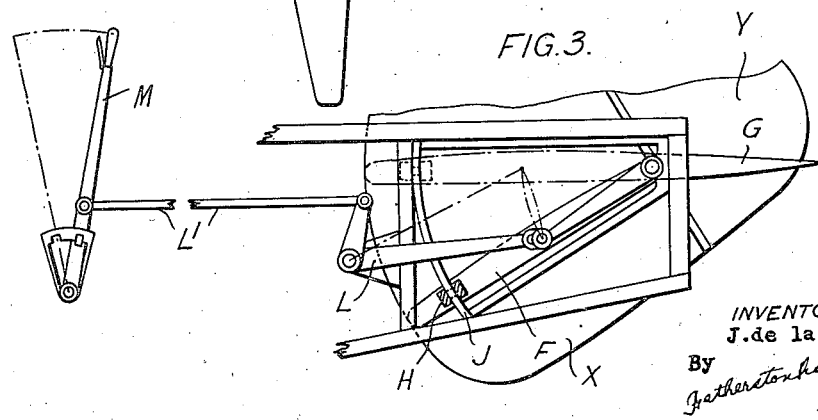

Patented May 10, 1932

1,857,807

UNITED STATES PATENT OFFICE

JUAN DE LA CIERVA, OF ALDWYCH, LONDON, ENGLAND, ASSIGNOR TO AUTOGIRO COMPANY OF AMERICA, OF PHILADELPHIA, PENNSYLVANIA, A CORPORATION OF DELAWARE

AIRCRAFT WITH AUTO-ROTATIVE WINGS

Application filed April 4, 1929, Serial No. 352,554, and in Great Britain October 27, 1928. Renewed December 18, 1929.

This invention relates to aircraft of the type equipped with auto-rotative wings or supporting surfaces turning about a substantially vertical axis and driven by the action of the relative air flow across them in flight. In aircraft of this type, in order to obtain an automatic centering of pressure the wings are preferably connected to the axis of rotation by means of articulated or hinge joints, which enable the wings to swing above and below the mean plane of rotation in accordance with varying resultants of lift and centrifugal force in different positions about the axis of rotation. This type of aircraft is known as the Cierva machine. The primary object of the present invention is to provide aircraft of the auto-rotative-wing type generally but more especially the auto-rotative pivotally-mounted-wing type referred to, with simple and effective means for initially setting the wings in rotation prior to leaving the ground or "taking off".

The present invention consists broadly in imparting initial rotation to the wing system by deflecting the slip-stream or air current from the propeller or propellers through the disc area swept by the wings.

It is preferable that the deflecting means should be carried by or form part of the aircraft itself since in such case starting means are at all times available wherever the aircraft may land. It is possible however to employ separate portable devices which may be set up on the ground adjacent the aircraft and then removed when the wings have attained the desired velocity. The deflecting means will normally take the form of plane or curved surfaces inclined to the axis of the slip-stream, and where carried by the aircraft said surfaces are rendered operative and inoperative at will, for instance by being made collapsible or capable of being rolled up or folded in any convenient manner into or close to the fuselage.

The actual deflecting devices may vary widely in construction and arrangement, collapsibility being obtained in numerous ways, for instance by making the deflecting surfaces of fairly stiff textile fabric mounted on spring rollers carried in the sides of the fuselage so that the fabric may be unrolled therefrom in the path of the slipstream. Alternatively fabric surfaces may be arranged to open and fold fan-wise, being normally housed in recesses in the sides of the fuselage. As a further alternative, especially where larger deflecting surfaces are required, as for example where the aircraft is equipped with laterally disposed engines, the fabric surfaces may be mounted on light telescopic tubes or lazytongs devices normally housed in the fuselage and extensible therefrom in any convenient manner.

As a still further alternative, the tail plane or empennage instead of being fixed as usual may be made capable of being set with or without the elevator to a substantial negative angle of incidence so as to deflect the slipstream upwardly.

The accompanying drawings illustrate, by way of example only, two methods of applying the present invention, it being understood that the invention is not in any way limited thereto since numerous other constructional arrangements will be clear from the foregoing description to persons skilled in aircraft construction.

Fig. 1 is a side elevational view of an aircraft of the pivotally-mounted autorotative-wing type having a relatively short fuselage and large control surfaces.

Fig. 2 is a plan view of Fig. 1, and

Fig. 3 is a detail view in elevation of the framework of the fuselage at the tail end showing means for adjusting the tail plane so as to deflect the slipstream upwardly.

Fig. 4 is a side elevational view of another machine of the Cierva type showing an alternative device for deflecting the slipstream.

Fig. 5 is a plan view of Fig. 4 showing the deflecting devices in extended operative position.

Fig. 6 is a detail view showing the method of mounting and operating the deflective devices, and Fig. 7 shows a section of one of the rollers on which the deflecting device is normally wound.

Referring more particularly to Figs. 1, 2 and 3:—

The aircraft comprises a body or fuselage A equipped with the usual landing elements and a system of auto-rotative wings B hinge-jointed to a hub member C mounted to revolve freely on a shaft D. E is a tractor air screw or propeller and F a tail plane carrying the elevator G. This tail plane F instead of being rigidly mounted as usual is pivoted at its rear end, and at its front end is provided with blocks H sliding on an arcuate guide J.

A bell crank lever L and a rod or cable $L^1$ connect the tail plane F to a lever M in the control cockpit so that the pilot by pulling the lever rearwardly can swing the tail plane F down to the position shown in full lines in Fig. 3 so that the slipstream from the propeller E is deflected upwards as indicated by the arrows in Fig. 1 across the wings B, causing them to be set rotating. When the desired velocity has been obtained, the pilot can restore the tail plane F to normal position by advancing the lever M which is provided with a locking device for both forward and rearward positions. If desired the elevator G may be made to assist the tail plane F in deflecting the slipstream by moving the elevator by means of the ordinary controls to a substantial negative angle of incidence.

It has been found that the effect is improved if more or less vertical surfaces or walls are provided to confine the slipstream and prevent it from spreading. For this purpose vertical fins X carrying rudder surfaces Y may be mounted at each end of the tail plane F, in place of a centrally disposed fin and rudder. Alternatively, the latter may be retained and additional vertical surfaces be provided at each end of the tail plane.

Referring now to Figs. 4 to 7:—

In each side of the fuselage A is mounted a spring loaded conical roller N with its axis inclined to the longitudinal axis of the fuselage. To each roller N is attached along one edge a segment-shaped piece of stiff textile fabric O such as sailcloth. This fabric is normally wound on the roller N which incorporates a spring $N^1$ after the manner of the well-known roller blind. The other straight edge of the fabric is secured to a rod P which forms one arm of a bell crank pivoted at $P^1$. The other arm $P^2$ is attached to a slide Q loaded by a spring $Q^1$ acting to swing the arm P to a position close to the roller N, with the fabric O wound on the roller.

A cable R is attached to the slide Q, and passing over a pulley S is carried forward to the control cockpit and secured to a lever T. By pulling this lever backwards the pilot can swing the arms P outwards from the sides of the fuselage thereby unwinding the fabric O in the path of the slipstream from the propeller E at an inclination such that the slipstream is deflected upwards across the tips of the rotative wings B thereby setting them in rotation. On releasing the lever T the spring $Q^1$ and the roller springs $N^1$ return the arms P into the sides of the fuselage, the fabric O being wound up on the rollers.

Spring loaded flaps of any convenient kind may be arranged to cover the openings in the sides of the fuselage when the deflectors O are housed therein.

It may be mentioned that the flexible fabric O bellies downwards under the action of the slipstream and may thus provide automatically the requisite side retaining walls. If desired however more or less vertical surfaces may be provided on the arms P and arranged to fold down when the fabric surfaces O are wound up on the rollers.

What I claim is:—

1. The method of operating an aircraft, having propelling means and sustaining blades mounted for swinging and rotational movement under the direct action of air-flow, which includes passing slip-stream from the propelling means against the sustaining blades to initiate rotation of said sustaining blades, subsequently substantially reducing the passage of slip-stream from the propelling means against the sustaining blades, utilizing the propelling means to effect flight operation of the craft, and then utilizing air-flow on the sustaining blades due to flight movements to maintain such rotation.

2. In combination, an aircraft having propelling means, sustaining blade surfaces swingingly and rotatively arranged for direct actuation by the relative air-flow in flight, and controllable means for effecting a flow of slip-stream from the propelling means against said sustaining blade surfaces for direct actuation thereof.

3. In combination, an aircraft having propelling means, sustaining blade surfaces swingingly and rotatively arranged for direct actuation by the relative air-flow in flight, and controllable means for effecting a flow of slip-stream from the propelling means against said sustaining blade surfaces for direct actuation thereof, and means for preventing dispersion of said flow.

4. In combination with an aircraft having propelling means and sustaining means movably mounted for actuation by the relative air-flow in flight, means for effecting a flow of slip-stream from the propelling means against said sustaining means, said last means serving also as a control device for the aircraft.

5. In combination with an aircraft having propelling means and sustaining means movably mounted for actuation by the relative air-flow in flight, means for effecting a flow of slip-stream from the propelling means against said sustaining means, and means for preventing lateral dispersion of said flow, said latter means serving also as a control device for the aircraft.

6. In combination with an aircraft having propelling means and sustaining means movably mounted for actuation by the relative air-flow in flight, means for effecting a flow of slip-stream from the propelling means against said sustaining means, said last means including a member serving in normal flight as a stabilizer.

7. In combination with an aircraft having propelling means and sustaining means movably mounted for actuation by the relative air-flow in flight, means for effecting a flow of slip-stream from the propelling means against said sustaining means, said last means including a member serving in normal flight as an elevator.

8. In combination with an aircraft having propelling means and sustaining means movably mounted for actuation by the relative air-flow in flight, means for effecting a flow of slip-stream from the propelling means against said sustaining means, said means including a member pivoted toward its rear edge on a transverse axis and serving in normal flight as a stabilizer.

9. In combination with an aircraft having propelling means and sustaining means movably mounted for actuation by the relative air-flow in flight, means for effecting a flow of slip-stream from the propelling means against said sustaining means, said means including a member pivoted toward its rear edge on a transverse axis and serving in normal flight as a stabilizer and a member pivoted toward its front edge on a transverse axis and serving in normal flight as an elevator.

10. In an aircraft having propelling means and sustaining blades mounted for rotation by relative air-flow, stabilizing and control surfaces for the aircraft, and means whereby at least one of said surfaces may be moved to a position to deflect air-flow through the path of travel of the sustaining blades, said surface being held in deflecting position by the action of said air-flow.

11. In an aircraft having propelling means and sustaining blades mounted for rotation by relative air-flow, stabilizing surfaces for the aircraft, and means whereby at least one of said surfaces may be moved to a position to deflect slip-stream from the propelling means through the path of travel of the sustaining blades, said surface being held in deflecting position by the action of said slip-stream.

12. In an aircraft having propelling means and sustaining blades mounted for rotation by relative air-flow, stabilizing surfaces for the aircraft, and means whereby at least one of said surfaces may be moved to a position to deflect air-flow through the path of travel of the sustaining blades, said surface being so disposed in its deflecting position that the action of said air-flow tends to maintain said surface in said position.

13. An aircraft embodying propelling and control means, a system of freely rotative supporting wings, and a displaceable surface adapted to be disposed in the slipstream from said propelling means at an inclination such that an air current is deflected through the disc area swept by said freely rotative wings.

14. An aircraft embodying a fuselage, propelling and control means, a system of freely rotative supporting wings and displaceable surfaces associated with said fuselage and adapted to be disposed in the slipstream from said propelling means at an inclination such that an air current is deflected through the disc area swept by said freely rotative wings.

15. An aircraft embodying a fuselage, propelling and control means, a system of freely rotative supporting wings, a tail plane, and means for setting said tail plane at an inclination to the slipstream from the propelling means such that a current of air is deflected through the disc area swept by said freely rotative wings.

16. An aircraft embodying a fuselage, propelling and control means, a system of freely rotative supporting wings a tail plane and an elevator associated therewith, and means operable by the pilot from his position in the aircraft for setting the tail plane at an inclination to the slipstream from said propelling means such that an air current is deflected through the disc area swept by said freely rotative wings.

17. An aircraft embodying a fuselage, propelling and control means, a system of freely rotative supporting wings carried by said fuselage, and surfaces normally located within said fuselage and extensible therefrom at an inclination to the slipstream from the propelling means such that a current of air is deflected through the disc area swept by said freely rotative wings.

18. An aircraft embodying a fuselage, propelling and control means, a system of freely rotative supporting wings carried by said fuselage, a conical roller located on each side of said fuselage, flexible material attached to each roller and normally kept wound thereon by springs, a rigid member secured to the free edge of each piece of flexible material, operative means connecting each rigid member to an actuating device in the control cockpit to enable the flexible material to be extended in the slipstream from the propelling means at an inclination such that an air current is deflected through the disc area swept by said freely rotative wings.

19. An aircraft embodying a fuselage, propelling and control means, a system of freely rotative supporting wings carried by said fuselage, a conical roller located in each side of said fuselage, flexible material attached to each of said rollers and normally kept wound thereon by springs, a rigid member secured to the free edge of each piece of flexible material, operative means connecting each rigid member to an actuating device in the control cockpit to enable the flexible material to be extended in the slipstream from the propelling means at an inclination such that an air current is deflected through the disc area swept by said freely rotative wings, and spring means for returning the flexible surfaces to normal position inside the fuselage.

20. An aircraft embodying propelling and control means, a system of freely rotative supporting wings, hinge-jointed to the axis of rotation, and a displaceable surface adapted to be disposed in the slipstream from said propelling means at an inclination such that an air current is deflected through the disc area swept by said freely rotative wings.

21. An aircraft embodying a fuselage, propelling and control means, a system of freely rotative supporting wings hinge-jointed to the axis of rotation, and displaceable surfaces associated with said fuselage and adapted to be disposed in the slipstream from said propelling means at an inclination such that an air current is deflected through the disc area swept by said freely rotative wings.

22. An aircraft embodying a fuselage, propelling and control means, a system of freely rotative supporting wings, hinge-jointed to the axis of rotation, a tail plane, and means for setting said tail plane at an inclination to the slipstream from the propelling means such that a current of air is deflected through the disc area swept by said freely rotative wings.

23. An aircraft embodying a fuselage, propelling and control means, a system of freely rotative suporting wings hinge-jointed to the axis of rotation, a tail plane and an elevator associated therewith, and means operable by the pilot from his position in the aircraft for setting the tail plane at an inclination to the slipstream from said propelling means such that an air current is deflected through the disc area swept by said freely rotative wings.

24. An aircraft embodying a fuselage, propelling and control means, a system of freely rotative supporting wings hinge-jointed to the axis of rotation carried by said fuselage, and surfaces normally located within said fuselage and extensible therefrom at an inclination to the slipstream from the propelling means such that a current of air is deflected through the disc area swept by said freely rotative wings.

25. An aircraft embodying a fuselage, propelling and control means, a system of freely rotative supporting wings hinge-jointed to the axis of rotation carried by said fuselage, a conical roller located in each side of said fuselage, flexible material attached to each roller and normally kept wound thereon by springs, a rigid member secured to the free edge of each piece of flexible material, operative means connecting each rigid member to an actuating device in the control cockpit to enable the flexible material to be extended in the slipstream from the propelling means at an inclination such that an air current is deflected through the disc area swept by said freely rotative wings.

26. An aircraft embodying a fuselage, propelling and control means, a system of freely rotative supporting wings hinge-jointed to the axis of rotation carried by said fuselage, a conical roller located in each side of said fuselage, flexible material attached to each of said rollers and normally kept wound thereon by springs, a rigid member secured to the free edge of each piece of flexible material, operative means connecting each rigid member to an actuating device in the control cockpit to enable the flexible material to be extended in the slipstream from the propelling means at an inclination such that an air current is deflected through the disc area swept by said freely rotative wings, and spring means for returning the flexible surfaces to normal position inside the fuselage.

27. An aircraft embodying a fuselage, propelling and control means, a system of freely rotative supporting wings a tail plane and an elevator associated therewith, substantially vertical surfaces arranged at each end of the tail plane and means operable by the pilot from his position in the aircraft for setting the tail plane at an inclination to the slipstream from said propelling means such that an air current is deflected through the disc area swept by said freely rotative wings.

28. An aircraft embodying a fuselage, propelling and control means, a system of freely rotative supporting wings, hinge-jointed to the axis of rotation, a tail plane and an elevator associated therewith, substantially vertical surfaces arranged at each end of the tail plane and means operable by the pilot from his position in the aircraft for setting the tail plane at an inclination to the slipstream from said propelling means such that an air current is deflected through the disc area swept by said freely rotative wings.

JUAN DE LA CIERVA.